(12) United States Patent
Szczesny (10) Patent No.: US 8,727,801 B2
(45) Date of Patent: May 20, 2014

(54) PLUGGABLE MODULES HAVING LATCH MECHANISMS FOR GRIPPING RECEPTACLE ASSEMBLIES

(75) Inventor: David S. Szczesny, Hershey, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 520 days.

(21) Appl. No.: 13/048,415

(22) Filed: Mar. 15, 2011

(65) Prior Publication Data

US 2012/0237288 A1 Sep. 20, 2012

(51) Int. Cl.
*H01R 13/627* (2006.01)
(52) U.S. Cl.
USPC ......... 439/352; 439/372; 403/322.4; 361/119
(58) Field of Classification Search
USPC ......... 403/322.1, 322.4; 439/352, 372, 476.1; 361/119
See application file for complete search history.

(56) References Cited

U.S. PATENT DOCUMENTS

| | | | |
|---|---|---|---|
| 3,807,675 A * | 4/1974 | Seckerson et al. | 248/73 |
| 4,439,006 A | 3/1984 | Stevenson | |
| 5,167,523 A * | 12/1992 | Crimmins et al. | 439/350 |
| 6,267,606 B1 | 7/2001 | Poplawski et al. | |
| 6,454,464 B1 | 9/2002 | Nolan | |
| 7,004,772 B1 * | 2/2006 | Hsiao et al. | 439/160 |
| 7,422,457 B1 * | 9/2008 | Wu | 439/258 |
| 7,542,271 B2 * | 6/2009 | Chen et al. | 361/679.33 |
| 7,892,015 B2 * | 2/2011 | Li et al. | 439/358 |

FOREIGN PATENT DOCUMENTS

| | | |
|---|---|---|
| DE | 2832839 A1 | 2/1980 |
| EP | 0125499 A2 | 11/1984 |
| JP | 2000180669 A | 6/2000 |
| WO | 2007053660 A1 | 5/2007 |

OTHER PUBLICATIONS

European Search Report, European Application No. EP12 15 9481, International Filing Date Mar. 14, 2012.

* cited by examiner

*Primary Examiner* — Gregory Binda
*Assistant Examiner* — Nahid Amiri (57) ABSTRACT

Pluggable module that includes a module housing having mating and trailing ends and a sidewall that extends therebetween. The sidewall extends along a longitudinal axis. The pluggable module further comprises a latch mechanism that is attached to the trailing end of the module housing. The latch mechanism includes a coupling arm that extends along the sidewall toward the mating end and also an operator handle that is operatively connected to the coupling arm at a latch joint. The operator handle projects away from the trailing end of the module housing. The operator handle is configured to be pressed by an actuating force to move the coupling arm into a flexed position. The latch joint moves when the operator handle is pressed and the coupling arm moves away from the sidewall to the flexed position. The coupling arm returns toward the sidewall when the actuating force is removed.

21 Claims, 5 Drawing Sheets

PLUGGABLE MODULES HAVING LATCH MECHANISMS FOR GRIPPING RECEPTACLE ASSEMBLIES

BACKGROUND OF THE INVENTION

The subject matter herein relates generally to connector assemblies for establishing an optical and/or electrical connection, and more particularly, to pluggable modules having coupling mechanisms that are configured to maintain the communicative connection between the pluggable module and a receptacle assembly.

Some communication systems, such as servers and data storage systems, use pluggable modules or transceivers for transmitting signals and/or power through the system. For example, a communication system may include a panel having one or more openings that provide access to receptacle assemblies within the system. The receptacle assemblies may include guideframes that house connectors therein. The guideframes are configured to receive and direct a corresponding pluggable module to the connector. The pluggable module may include electrical contacts or optical terminals that engage corresponding contacts or terminals of the connector. In some cases, the connection between the two is maintained through frictional forces between the pluggable module and the receptacle assembly. However, it may be desirable to have an additional mechanism for maintaining the connection between the pluggable module and the receptacle assembly to prevent inadvertent removal of the pluggable module.

For example, the pluggable modules may include a fastener that attaches directly to the panel through a fastener opening. However, due to manufacturing tolerances of some communication systems, the fastener opening of the panel may not be properly positioned. In such cases, the fastener may be unable to properly attach to the panel. In one known communication system, a jackscrew is inserted through a body of the pluggable module to engage directly to the connector at a rear portion of the guideframe. However, it may be necessary to increase dimensions of the pluggable module to accommodate the jackscrew. This may be undesirable in applications where space is limited.

Accordingly, there is a need for mechanisms that facilitate maintaining the connection between the pluggable module and the receptacle assembly.

BRIEF DESCRIPTION OF THE INVENTION

In one embodiment, a pluggable module is provided that includes a module housing having mating and trailing ends and a sidewall that extends therebetween. The sidewall extends along a longitudinal axis. The module housing is configured to be inserted into a receptacle assembly. The pluggable module further comprises a latch mechanism that is attached to the trailing end of the module housing. The latch mechanism includes a coupling arm that extends along the sidewall toward the mating end and also an operator handle that is operatively connected to the coupling arm at a latch joint. The operator handle projects away from the trailing end of the module housing. The operator handle is configured to be pressed by an actuating force to move the coupling arm away from the sidewall. The coupling arm returns toward the sidewall when the actuating force is removed.

In another embodiment, a pluggable module is provided that includes a module housing having mating and trailing ends. The module housing also includes a pair of sidewalls that extend between the mating and trailing ends and face in opposite directions. The sidewalls extend along a longitudinal axis. The module housing is configured to be inserted into a receptacle assembly. The pluggable module also includes a dual-action latch mechanism that is attached to the trailing end of the module housing. The latch mechanism includes a bridge segment that extends between and joins first and second latch joints and also first and second coupling arms that are coupled to the first and second latch joints, respectively. The first and second coupling arms extend substantially parallel to each other and toward the mating end. Each of the first and second coupling arms extends along one respective sidewall of the module housing. The latch mechanism also includes first and second operator handles that are coupled to the first and second latch joints, respectively. Each of the first and second operator handles extends away from the trailing end of the module housing. The first and second operator handles are configured to be pressed by actuating forces to move the first and second coupling arms away from the respective sidewalls. The first and second coupling arms return toward the respective sidewalls and each other when the actuating forces are removed.

In yet another embodiment, a dual-action latch mechanism that is configured to be attached to a module housing is provided. The latch mechanism includes a bridge segment that extends between and joins first and second latch joints and also first and second coupling arms that are coupled to the first and second latch joints, respectively. The first and second coupling arms extend substantially parallel to each other along a longitudinal axis. The latch mechanism also includes first and second operator handles that are coupled to the first and second latch joints, respectively. Each of the first and second operator handles is configured to extend away from the module housing. The first and second operator handles are configured to be pressed by actuating forces to move the first and second coupling arms away from each other. The first and second coupling arms return toward each other when the actuating forces are removed.

DETAILED DESCRIPTION OF THE INVENTION

Embodiments described herein include pluggable modules and communication systems that are configured to establish at least one of an electrical and optical connection to transmit data signals and/or to establish an electrical connection for transmitting power. Embodiments also include latch mechanisms that may be used by the pluggable modules and communication systems to facilitate maintaining the communicative connection and/or preventing the pluggable module from being inadvertently withdrawn.

Figure 1:
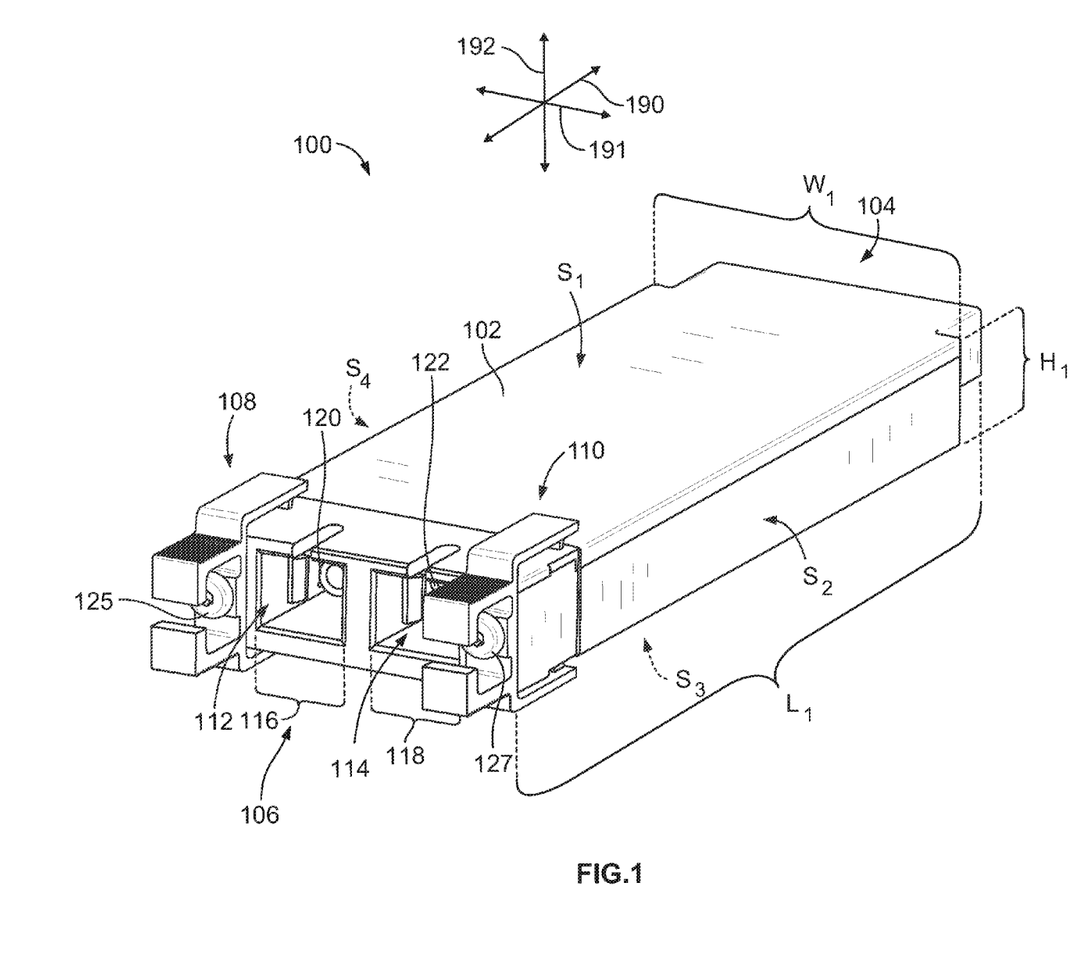
FIG. 1 is a perspective view of a pluggable module formed in accordance with one embodiment.

FIG. 1 is a perspective view of a pluggable module 100 formed in accordance with one embodiment. The pluggable module 100 is oriented with respect to a longitudinal axis 190, a lateral axis 191, and an elevation or vertical axis 192. The pluggable module 100 includes a module housing or body 102 that extends along the longitudinal axis 190 between a mating end 104 and a trailing end 106. The module housing 102 has a plurality of sidewalls $S_1$-$S_4$ that extend substantially parallel to one another and along the longitudinal axis 190. The sidewalls $S_1$-$S_4$ extend between the mating and trailing ends 104 and 106. The module housing 102 has a length $L_1$ that is measured along the longitudinal axis 190, a height $H_1$ measured along the vertical axis 192, and a width $W_1$ measured along the lateral axis 191.

As shown, the pluggable module 100 also includes latch mechanisms 108 and 110 that are attached to the trailing end 106 of the module housing 102. Although two latch mechanisms 108 and 110 are shown in FIG. 1, the pluggable module 100 may include only one latch mechanism or more than two latch mechanisms in other embodiments. The latch mechanisms 108 and 110 are configured to engage a receptacle assembly 202 (shown in FIG. 4) to facilitate maintaining a communicative connection between the pluggable module 100 and the receptacle assembly 202 and/or prevent inadvertent withdrawal of the pluggable module 100. The latch mechanisms 108 and 110 are configured to be engaged by an operator (i.e., an individual or machine) to disengage the latch mechanisms 108 and 110 from the receptacle assembly 202.

The latch mechanisms 108 and 110 may be removably attached to the module housing 102. For example, the latch mechanisms 108 and 110 may be secured to the module housing 102 at the trailing end 106 by fasteners 125 and 127 (e.g., screws or threaded fasteners). Although the fasteners 125 and 127 are threaded fasteners 125 and 127 in the illustrated embodiment, the fasteners 125 and 127 may be other types capable of attaching the latch mechanisms 108 and 110 to the module housing 102. For example, the fasteners 125 and 127 may be plugs, snap-on clips, and the like. In alternative embodiments, the latch mechanisms 108 and 110 are attached to the trailing end 106 using an adhesive. Furthermore, in other embodiments, the latch mechanisms 108 and 110 may be integrally formed with other components of the module housing 102. In such cases, the latch mechanisms 108 and 110 may also be characterized as being attached to the module housing 102.

Also shown in FIG. 1, the module housing 102 includes ports 112 and 114. The ports 112 and 114 are configured to communicatively engage plugs (not shown) from cables or wires. To this end, the ports 112 and 114 may include plug-receiving spaces 116 and 118, respectively, having corresponding loading connectors 120 and 122 disposed therein. In the illustrated embodiment, the ports 112 and 114 are positioned between the latch mechanisms 108 and 110 along the lateral axis 191. In alternative embodiments, the ports 112 and 114 may not include the plug-receiving spaces 116 and 118. Instead, the loading connectors 120 and 122 may be attached to and project directly from the mating end 106.

In the illustrated embodiment, the pluggable module 100 is an optical module that converts optical signals into electrical signals and/or electrical signals into optical signals. However, the pluggable module 100 is not limited to particular types of modules or connectors. For example, in other embodiments, the pluggable module 100 may be an electrical connector that transmits electrical signals without converting the electrical signals into optical signals. An electrical connector may also exclusively transmit electrical power therethrough. The pluggable module 100 may also be an optical module that does not convert data signals into electrical and/or optical signals. For example, the optical module may interconnect two fiber ends to transmit optical signals therethrough.

Furthermore, in the illustrated embodiment, the module housing 102 is substantially rectangular and has a rectangular cross-section that is taken perpendicular to the longitudinal axis 190. However, in other embodiments, the module housing 102 may have other shapes. For example, the module housing may have a cross-section that is square-shaped or at least partially circular or elliptical. Furthermore, the module housing 102 may be elongated such that the length $L_1$ is greater than the other dimensions. However, the width $W_1$ and height $H_1$ may be greater than the length $L_1$ in other embodiments.

Figure 2:
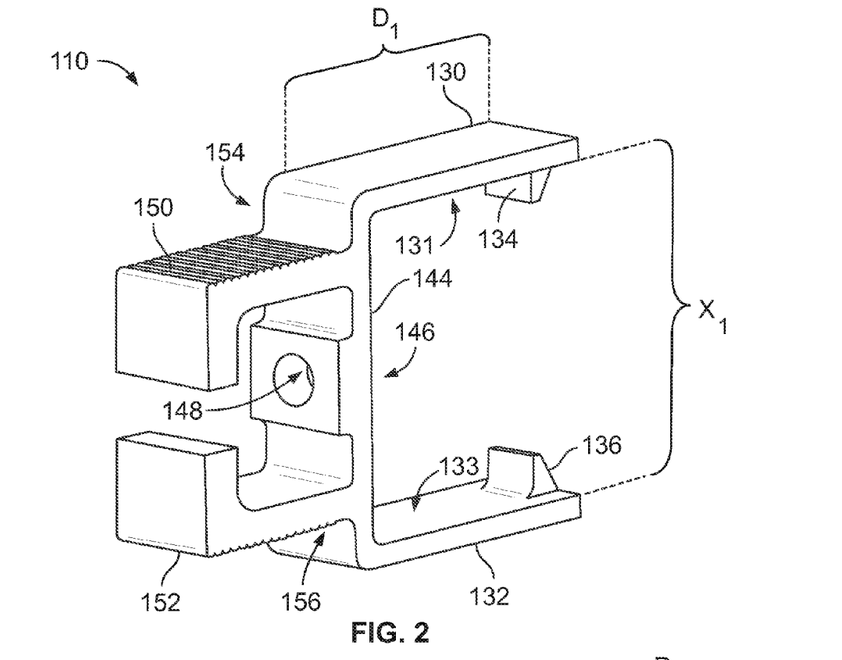
FIG. 2 is an isolated perspective view of a latch mechanism formed in accordance with one embodiment that may be used with the pluggable module of FIG. 1.
Figure 3:
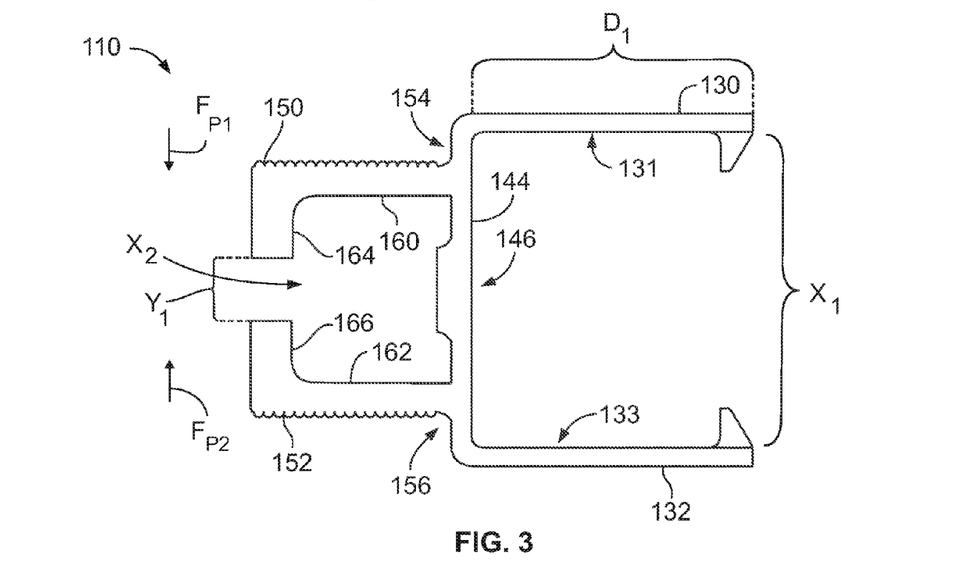
FIG. 3 is a side view of the latch mechanism of FIG. 2.

FIG. 2 is an isolated perspective view of the latch mechanism 110, and FIG. 3 is a side view of the latch mechanism 110 formed in accordance with one embodiment. Although the following is with specific reference to the latch mechanism 110, the following description may be similarly applied to the latch mechanism 108 (FIG. 1). In the illustrated embodiment, the latch mechanism 110 includes a pair of coupling arms 130 and 132 that are separated by a module-reception space $X_1$. The module-reception space $X_1$ is sized and shaped to receive the trailing end 106 (FIG. 1) of the module housing 102. The coupling arms 130 and 132 extend substantially parallel to each other and the longitudinal axis 190 (FIG. 1). The coupling arms 130 and 132 may extend a distance $D_1$ along the longitudinal axis 190 toward the mating end 104. The coupling arms 130 and 132 may comprise a resilient flexible material that permits the coupling arms 130 and 132 to flex to and from each other.

Also shown, the coupling arms 130 and 132 have inner surfaces 131 and 133 that face each other across the module-reception space $X_1$. The inner surfaces 131 and 133 may include grip projections 134 and 136. The grip projections 134 and 136 extend inward toward each other. In the illustrated embodiment, each of the grip projections 134 and 136 is a single projection or tooth that is configured to grip the receptacle assembly 202 (FIG. 3). In other embodiments, the grip projections 134 and 136 may each comprise a plurality of projections that are configured to grip the receptacle assembly 202. However, in alternative embodiments, the coupling arms 130 and 132 may not include grip projections. For example, the inner surfaces 131 and 133 can directly engage the receptacle assembly 202.

In the illustrated embodiment, the coupling arms 130 and 132 are joined by a bridge segment 144 that extends across the module-reception space $X_1$. The bridge segment 144 may include an attachment portion 146 that is configured to receive the fastener 125 (FIG. 1). For example, the attachment portion 146 may include a thru-hole 148 (FIG. 2) that is configured to receive the fastener 125. When the latch mechanism 110 is attached to the trailing end 106, the attachment portion 146 is secured to the trailing end 106 by the fastener 125 such that the attachment portion 146 is affixed to the module housing 102. More specifically, other portions of the latch mechanism 110 may be moveable relative to the module housing 102 while the attachment portion 146 has a fixed position relative to the module housing 102.

The latch mechanism 110 also includes operator handles 150 and 152 and latch joints 154 and 156. The bridge segment 144 extends between and joins the latch joints 154 and 156. The operator handle 150 is operatively connected to the coupling arm 130 at the latch joint 154, and the operator handle 152 is operatively connected to the coupling arm 132 at the latch joint 156. More specifically, the operator handles 150 and 152 are operatively connected such that when actuating forces $F_{P1}$ and $F_{P2}$ (shown in FIG. 3) are applied to the operator handles 150 and 152, the coupling arms 130 and 132 flex away from each other thereby increasing the size of the module-reception space $X_1$. The coupling arms 130 and 132 may move from unflexed or home positions (as shown in FIGS. 1-3) to flexed positions (shown in FIG. 6). In some embodiments, the latch joints 154 and 156 can also move relative to the module housing 102 when the actuating forces $F_{P1}$ and $F_{P2}$ are applied. When the actuating forces $F_{P1}$ and $F_{P2}$ are removed, the coupling arms 130 and 132 may return toward each other to the home positions.

With reference to FIG. 3, the operator handles 150 and 152 are configured to be engaged by an operator, such as an individual or machine, to move the coupling arms 130 and 132 to the flexed positions. The operator handles 150 and 152 include handle segments 160 and 162, respectively, that extend along the longitudinal axis 190 (FIG. 1). The handle segments 160 and 162 may be sized and shaped so that an individual may press the handle segments 160 and 162 with one or more fingers. The operator handles 150 and 152 may also include handle extensions 164 and 166 that extend along the vertical axis 192 (FIG. 1). The handle extensions 164 and 166 may extend from the corresponding handle segments 160 and 162. For example, the handle extensions 164 and 166 may extend away from distal ends of the corresponding handle segments 160 and 162. In other embodiments, the handle extensions 164 and 166 may extend away from other locations of the corresponding handle segments 160 and 162. The handle extensions 164 and 166 may extend toward each other and be separated by a gap.

Also shown, the operator handles 150 and 152 are spaced apart and define an operator space $X_2$ therebetween. In particular embodiments, the operator space $X_2$ may be sized and shaped to permit one or more fingers of an individual to be inserted therethrough to facilitate gripping the operator handles 150 and 152 during operation of the latch mechanism 110. For example, the handle segments 160 and 162 and the handle extensions 164 and 166 may be sized and shaped to permit one or more fingers of an individual to be inserted through the operator space $X_2$. However, in other embodiments, the operator space $X_2$ may not be large enough to permit one or more fingers of an individual to be inserted therethrough.

In addition, the operator handles 150 and 152 may be separated from each other by a distance $Y_1$. In the illustrated embodiment, the distance $Y_1$ is measured along the elevation axis 192 between distal ends of the handle extensions 164 and 166. The distance $Y_1$ may be configured to prevent the operator handles 150 and 152 from being damaged due to excessive bending when the operator handles 150 and 152 are moved toward each other (e.g., when the actuating forces $F_{P1}$ and $F_{P2}$ are applied). For example, when the operator handles 150 and 152 are moved toward each other, distal ends of the handle extensions 164 and 166 may be moved closer together until the distance $Y_1$ becomes zero and the handle extensions 164 and 166 engage each other. At this time, the handle extensions 164 and 166 resist further movement along the elevation axis 191. In alternative embodiments, the operator handles 150 and 152 may engage each other at other points instead of along the handle extensions 164 and 166. Generally, the distance $Y_1$ may be measured between any respective points on the operator handles 150 and 152 that engage each other when the operator handles are brought together. When the operator handles 150 and 152 are engaged and resist movement toward each other, the resistive forces may facilitate an individual in gripping the handle segments 160 and 162. For example, an individual's fingers may grip knurling on the handle segments 160 and 162.

As shown in FIGS. 2 and 3, the latch mechanism 110 may constitute a dual-action latch mechanism in that two coupling arms 130 and 132 may be actuated and moved simultaneously (or not simultaneously) to disengage the latch mechanism 110 from the receptacle assembly 202. However, in other embodiments, latch mechanisms may include only a single coupling arm. In such embodiments, the bridge segment may not extend between a pair of latch joints, but instead, for example, may extend from a single latch joint to an attachment portion that is secured to the module housing 102 as described above. Furthermore, in such embodiments, a single operator handle may be pressed to move the coupling arm away from the module housing to the flexed position. In addition, the handle segment and the handle extension may be sized and shaped for an individual or machine to grip the operator handle and press and pull the operator handle.

In some embodiments, the operator handles 150 and 152, the latch joints 154 and 156, and the coupling arms 130 and 132 are integrally formed with a common material. For example, the latch mechanism 110 may be manufactured through a molding-type process. The common material may be a flexible and resilient material, such as a thermoplastic. However, in other embodiments, the latch mechanism 110 may be constructed from separate components or parts.

Figure 4:
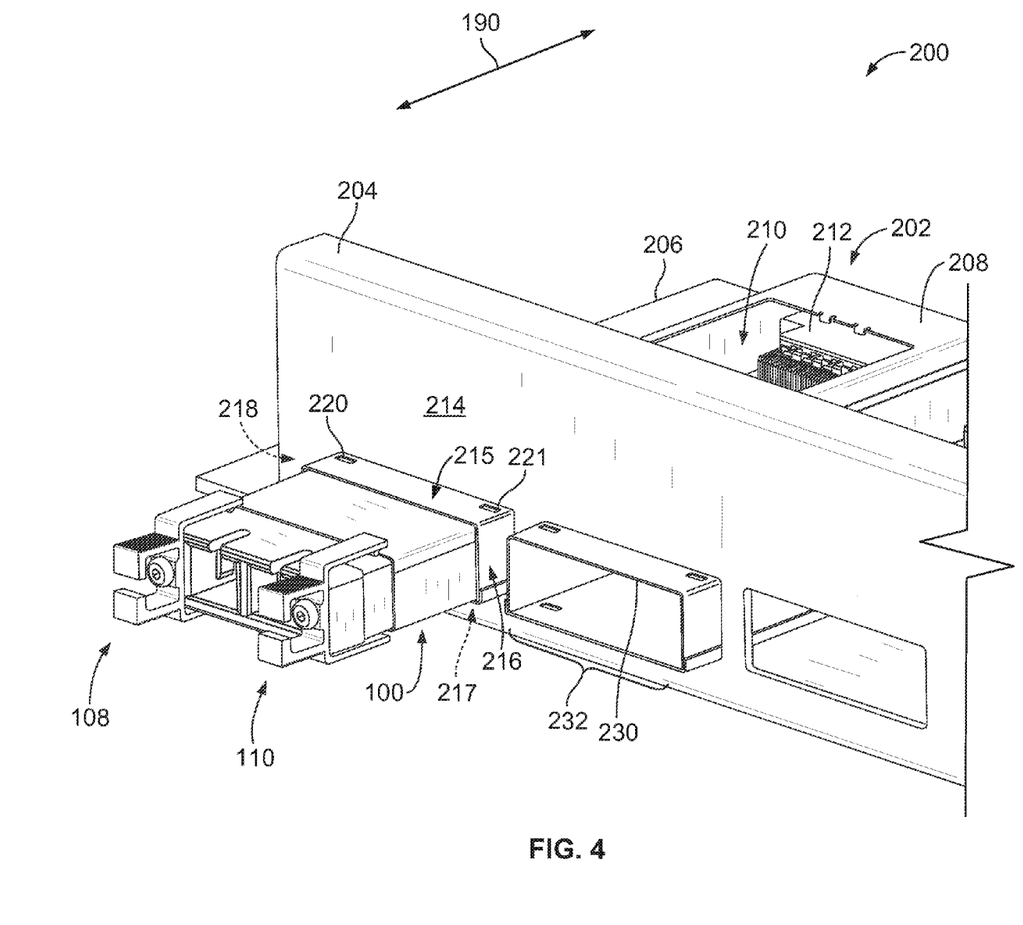
FIG. 4 is a perspective view of a communication system that includes the pluggable module of FIG. 1.

FIG. 4 is a perspective view of a communication system 200 that includes the pluggable module 100. As shown, the communication system 200 may include, among other things, the receptacle assembly 202, a panel 204, and a circuit board 206. As shown, the receptacle assembly 202 is mechanically and electrically mounted to the circuit board 206 and includes a guideframe 208 that defines a receptacle cavity 210 configured to receive the pluggable module 100. The receptacle assembly 202 also includes a communication connector 212 disposed within the receptacle cavity 210. In the illustrated embodiment, the communication connector 212 is an electrical connector that transmits data signals to and from the circuit board 206. However, in other embodiments, the communication connector 212 may be, for example, an optical connector or a power connector.

As shown, the guideframe 208 projects beyond an exterior face 214 of the panel 204. The guideframe 208 may include a plurality of sides or walls 215-218 that define the receptacle cavity 210. The guideframe 208 may be stamped and formed from a common piece of sheet material as shown in FIG. 4 or, alternatively, constructed from separate parts. In the illustrated embodiment, the walls 215 and 217 include gripping features 220 and 221. The gripping features 220 and 221 are stamped indentations in the exemplary embodiment. However, in other embodiments, the gripping features 220 and 221 may be thru-holes or projections that permit the guideframe 208 to be gripped by the latch mechanisms 108 and 110. As shown in FIG. 4, the pluggable module 100 has been inserted into the receptacle cavity 210 but is in an unengaged state with respect to the communication connector 212 (i.e., the pluggable module 100 is partially inserted or partially withdrawn).

Figure 5:
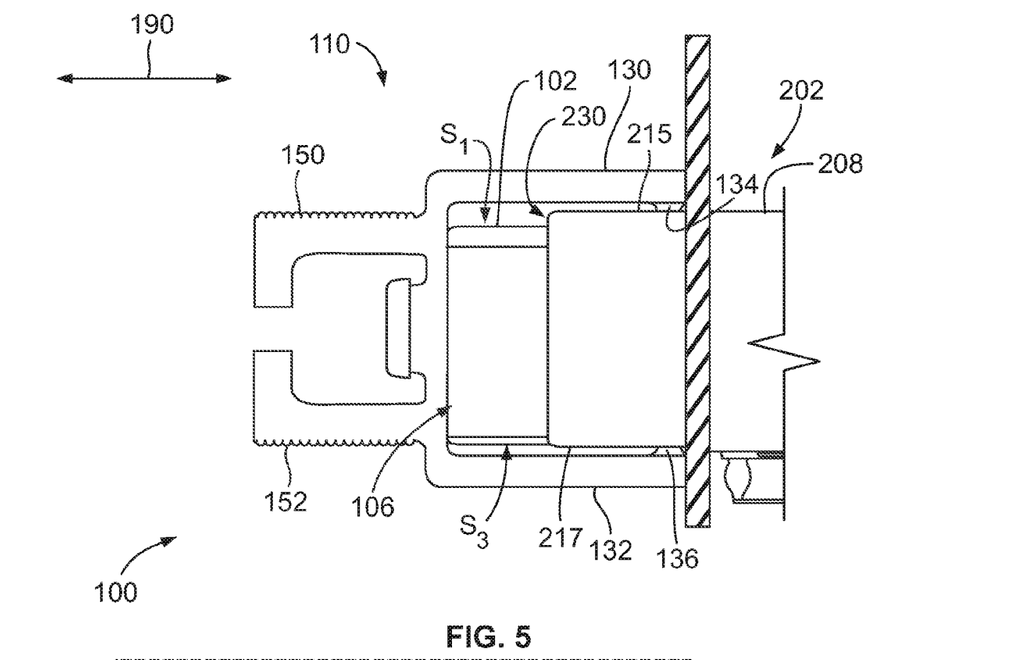
FIG. 5 is a side view of the pluggable module inserted into a receptacle assembly of the communication system shown in FIG. 4.

FIG. 5 is a side view of the pluggable module 100 inserted into the receptacle assembly 202. As shown, the latch mechanism 110 is attached to the trailing end 106 of the module housing 102. More specifically, the latch mechanism 110 may be attached to a wall or surface of the trailing end 106 that faces in a direction along the longitudinal axis 190. The coupling arms 130 and 132 extend along respective sidewalls $S_1$ and $S_3$ toward the mating end 104 (FIG. 1). The operator handles 150 and 152 project away from the trailing end 106 along the longitudinal axis 190.

To communicatively engage the receptacle assembly 202 and the pluggable module 100, the pluggable module 100 may be inserted into the receptacle cavity 210 (FIG. 4) and moved in an axial direction along the longitudinal axis 190 so that the mating end 104 engages the communication connector 212 (FIG. 4). As shown in FIG. 5, the guideframe 208 may include a front edge 230 that defines an opening 232 (FIG. 4) to the receptacle cavity 210. As the pluggable module 100 moves in the axial direction toward the communication connector 212, the grip projections 134 and 136 engage the front edge 230. The grip projections 134 and 136 may be shaped so that the coupling arms 130 and 132 are deflected outward by the front edge 230 to deflected positions. More specifically, the coupling arms 130 and 132 may be deflected away from each other and the respective sidewalls $S_1$ and $S_3$ module housing 102. The deflected positions may or may not be the same as the flexed positions. The walls 215 and 217 of the guideframe 208 move between the coupling arms 130 and 132, respectively, and the respective sidewalls $S_1$ and $S_3$. When the grip projections 134 and 136 clear the gripping features 221 (FIG. 4) on the walls 215 and 217, the coupling arms 130 and 132 resiliently spring back toward the home positions.

In the illustrated embodiment shown in FIG. 5, the grip projections 134 and 136 are at least partially inserted into the gripping features 221. Accordingly, the latch mechanisms 108 (FIG. 1) and 110 effectively prevent inadvertent withdrawal of the module housing 102 from the receptacle assembly 202. For example, the latch mechanisms 108 and 110 may prevent inadvertent removal of the module housing 102 by excessive vibrations or accidental bumping by an individual.

Figure 6:
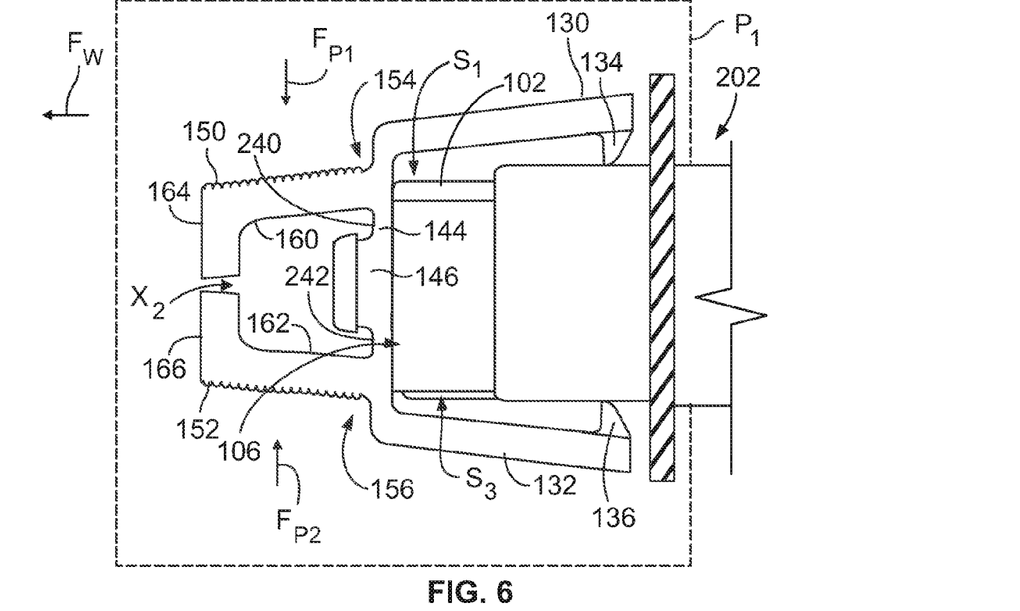
FIG. 6 is a side view of the pluggable module when a latch mechanism of the pluggable module is engaged.

FIG. 6 is a side view of the pluggable module 100 in an engaged state with the receptacle assembly 202 and showing the latch mechanism 110 activated to withdraw the pluggable module 100. To disengage and remove the pluggable module 100, the actuating forces $F_{P1}$ and $F_{P2}$ are applied to the handle segments 160 and 162 of the operator handles 150 and 152, respectively. In the illustrated embodiment of FIG. 6, the actuating forces $F_{P1}$ and $F_{P2}$ are directed toward each other. The actuating forces $F_{P1}$ and $F_{P2}$ may be applied by, for example, an individual's fingers.

In the illustrated embodiment, when the actuating forces $F_{P1}$ and $F_{P2}$ are applied, the operator handles 150 and 152, the latch joints 154 and 156, and the coupling arms 130 and 132 move within a common plane $P_1$ into corresponding flexed positions. The plane $P_1$ may extend parallel to the longitudinal axis 190 and the vertical axis 192 (FIG. 1). In other embodiments, the operator handles 150 and 152, the latch joints 154 and 156, and the coupling arms 130 and 132 move in different planes that are proximate to each other and parallel to each other. In the illustrated embodiment, the latch joints 154 and 156 move relative to the module housing 102. The coupling arms 130 and 132 move away from the respective sidewalls $S_1$ and $S_3$ and each other to the corresponding flexed positions. As shown, the bridge segment 144 may include lever portions 240 and 242 that extend from the latch joints 154 and 156, respectively, to the attachment portion 146. The lever portions 240 and 242 may move with respect to the module housing 102 and flex away from the trailing end 106. However, as shown in FIG. 6, the attachment portion 146 may remain secured to the module housing 102. Thus, the coupling arm 130, the latch joint 154, the lever portion 240, and the operator handle 150 may rotate in a common direction (e.g., a counter-clockwise direction) relative to the attachment portion 146. Likewise, the coupling arm 132, the latch joint 156, the lever portion 242, and the operator handle 152 may rotate in a common direction (e.g., a clockwise direction) relative to the attachment portion 146. Thus, the two separate assemblies or portions of the latch mechanism 110 may rotate in different directions such that the operator handles 150 and 152 are moved closer together. As described above, in particular embodiments the operator handles 150 and 152 may close the distance $Y_1$ (FIG. 2) that separates the operator handles 150 and 152 and engage each other in order to prevent the operator handles 150 and 152 from being damaged.

As shown in FIG. 6, the grip projections 134 and 136 may be removed from the gripping features 221 (FIG. 4) when the coupling arms 130 and 132 are in the flexed positions. When in the flexed positions, the pluggable module 100 is permitted to be withdrawn from the receptacle assembly 202. The individual or machine may then apply a withdrawing force $F_W$ along the longitudinal axis 190. When the pluggable module 100 is withdrawn, the operator handles 150 and 152 may be gripped by the individual or machine. For example, an individual's finger or fingers may be inserted into the operator space $X_2$ and grip and pull the operator handles 150 and 152. In the illustrated embodiment, the individual may grip the handle extensions 164 and 166 to remove the pluggable module 100. The coupling arms 130 and 132 are configured to return toward the sidewalls $S_1$ and $S_3$ and the home positions when the actuating forces $F_{P1}$ and $F_{P2}$ are removed.

In the exemplary embodiment, the latch mechanism 110 is a dual-action mechanism in which both the coupling arms 130 and 132 are moved to flexed positions. However, as discussed above, the latch mechanism 110 is not required to be dual-action. For example, the latch mechanism 110 may include only the coupling arm 130, which may extend along the sidewall $S_1$ of the module housing 102 toward the mating end 104, and only the operator handle 150 operatively connected to the coupling arm 130 at the latch joint 154. The bridge segment 144 may include only the attachment portion 146 and the lever portion 240. The operator handle 150 may be configured to be pressed by the actuating force $F_{P1}$ to move the coupling arm 130 into the flexed position. The latch joint 154 may move relative to the module housing 102 when the operator handle 150 is pressed and the coupling arm 130 may move away from the sidewall $S_1$ to the flexed position. The coupling arm 130 may return toward the sidewall $S_1$ when the actuating force $F_{P1}$ is removed.

Figure 7:
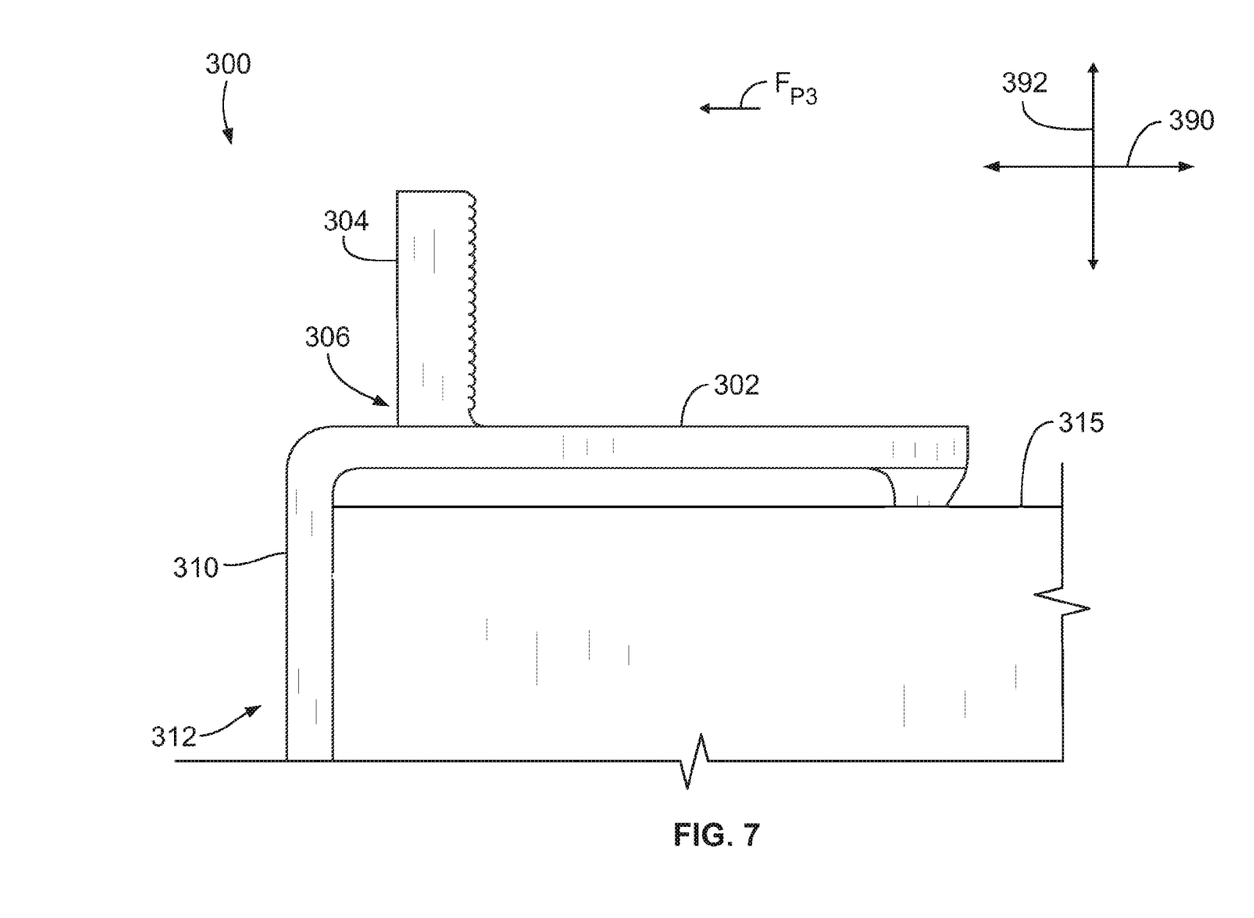
FIG. 7 is a side view of a latch mechanism formed in accordance with another embodiment.

FIG. 7 is a side view of a latch mechanism 300 formed in accordance with an alternative embodiment. The latch mechanism 300 may be attached to, for example, the pluggable module 100 (FIG. 1) and used with the communication system 200 (FIG. 4). As shown, the latch mechanism 300 includes a coupling arm 302 and an operator handle 304 that are operatively connected to each other at a latch joint 306. The latch mechanism 300 may also include a bridge segment 310 that extends from the latch joint 306 to an attachment portion 312. The coupling arm 302 may extend along a longitudinal axis 390 and the operator handle 304 may project away from the latch joint 306 in a direction along an elevation or vertical axis 392. To move the coupling arm 302 to a flexed position, an actuating force $F_{P3}$ in a direction along the longitudinal axis 390 may be applied to the operator handle 304. When applied, the coupling arm 302 moves away from the module housing 315. In some embodiments, the latch joint 306 may move relative to the module housing 315.

It is to be understood that the above description is intended to be illustrative, and not restrictive. In addition, the above-described embodiments (and/or aspects thereof) may be used in combination with each other. Furthermore, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A pluggable module comprising:
   a communication connector configured to transmit at least one of data signals or electrical power;
   a module housing having mating and trailing ends and a sidewall that extends therebetween, the communication connector being at least partially disposed within the module housing, the sidewall of the module housing extending along a longitudinal axis, the module housing being configured to be inserted into a receptacle assembly to communicatively engage the receptacle assembly and the communication connector; and
   a latch mechanism attached to the trailing end of the module housing, the latch mechanism including a coupling arm that extends along the sidewall toward the mating end and an operator handle that is operatively connected to the coupling arm at a latch joint, the operator handle projecting away from the trailing end of the module housing, wherein the operator handle is configured to be pressed by an actuating force to move the coupling arm away from the sidewall, the coupling arm returning toward the sidewall when the actuating force is removed.

2. The pluggable module in accordance with claim 1, wherein the latch joint moves relative to the module housing when the operator handle is pressed.

3. The pluggable module in accordance with claim 1, wherein the operator handle, the latch joint, and the coupling arm move within a common plane.

4. The pluggable module in accordance with claim 1, wherein the operator handle projects away from the trailing end in a direction that is one of substantially perpendicular to the longitudinal axis and substantially parallel to the longitudinal axis.

5. The pluggable module in accordance with claim 1, wherein at least a handle segment of the operator handle extends substantially parallel to the longitudinal axis, the handle segment configured to receive the actuating force for moving the coupling arm.

6. The pluggable module in accordance with claim 1, wherein the coupling arm includes a grip projection that extends toward the sidewall.

7. The pluggable module in accordance with claim 1, wherein the operator handle, the latch joint, and the coupling arm are integrally formed with a common material.

8. The pluggable module in accordance with claim 1, wherein the sidewall is a first sidewall and the latch mechanism is a first latch mechanism, the pluggable module further comprising a second sidewall that extends substantially parallel to the first sidewall and a second latch mechanism, the coupling arms of the first and second latch mechanisms extending substantially parallel to each other along the first and second sidewalls, respectively, the coupling arms moving away from each other when the operator handles of the first and second latch mechanisms are pressed by opposing actuating forces.

9. The pluggable module of claim 1, wherein the latch mechanism further comprises an attachment portion that is affixed to the module housing such that the attachment portion has a fixed position relative to the module housing when the actuating force is applied to the operator handle and also when the actuating force is removed from the operator handle, the coupling arm rotating relative to the attachment portion when the operator handle is pressed by the actuating force.

10. The pluggable module of claim 1, wherein the latch mechanism further comprises an attachment portion that is affixed to the module housing, the attachment portion having a fixed position relative to the module housing when the actuating force is applied to the operator handle such that the attachment portion moves with the module housing when the latch mechanism is pulled to withdraw the module housing from the receptacle assembly.

11. The pluggable module of claim 1, wherein the module housing includes a port at the trailing end, the communication connector being accessed through the port.

12. A pluggable module comprising:
   a module housing having mating and trailing ends and a sidewall that extends therebetween, the sidewall extending along a longitudinal axis, the module housing being configured to be inserted into a receptacle assembly; and
   a latch mechanism attached to the trailing end of the module housing, the latch mechanism including a coupling arm that extends along the sidewall toward the mating end and an operator handle that is operatively connected to the coupling arm at a latch joint, the operator handle projecting away from the trailing end of the module housing, wherein the operator handle is configured to be pressed by an actuating force to move the coupling arm away from the sidewall, the coupling arm returning toward the sidewall when the actuating force is removed;
   wherein the latch mechanism further comprises an attachment portion that is affixed to the module housing such that the attachment portion has a fixed position relative to the module housing when the actuating force is applied to the operator handle and also when the actuating force is removed from the operator handle, the coupling arm rotating relative to the attachment portion when the operator handle is pressed by the actuating force.

13. The pluggable module of claim 12, further comprising a fastener that secures the attachment portion in the fixed position relative to the module housing.

14. The pluggable module of claim 13, wherein the attachment portion has a thru-hole, the fastener being a threaded fastener that extends through the thru-hole and engages the module housing.

15. A pluggable module comprising:
   a communication connector configured to transmit at least one of data signals or electrical power;
   a module housing having mating and trailing ends and a pair of sidewalls that extend therebetween, the communication connector being at least partially disposed within the module housing, the pair of sidewalls of the module housing facing in opposite directions and extending along a longitudinal axis, the module housing being configured to be inserted into a receptacle assembly to communicatively engage the receptacle assembly and the communication connector; and a dual-action latch mechanism attached to the trailing end of the module housing, the latch mechanism comprising:

a bridge segment extending between and joining first and second latch joints;

first and second coupling arms coupled to the first and second latch joints, respectively, the first and second coupling arms extending substantially parallel to each other and toward the mating end, each of the first and second coupling arms extending along one respective sidewall of the module housing; and first and second operator handles coupled to the first and second latch joints, respectively, each of the first and second operator handles projecting away from the trailing end of the module housing;

wherein the first and second operator handles are configured to be pressed by actuating forces to move the first and second coupling arms away from the respective sidewalls and each other, the first and second coupling arms returning toward the respective sidewalls and each other when the actuating forces are removed.

16. The pluggable module in accordance with claim 15, wherein the first and second latch joints move relative to the module housing when the operator handles are pressed.

17. The pluggable module in accordance with claim 15, wherein the bridge segment includes an attachment portion that is located between the first and second latch joints and affixed to the module housing, the attachment portion having a fixed position relative to the module housing when the actuating force is applied to the operator handle such that the attachment portion moves with the module housing when the module housing is withdrawn from the receptacle assembly.

18. The pluggable module in accordance with claim 15, wherein the first and second operator handles, the first and second latch joints, and the first and second coupling arms are configured to move within one of a common plane and respective planes that are proximate to each other and parallel to each other.

19. The pluggable module in accordance with claim 15, wherein at least a portion of the first and second operator handles project away from the trailing end in a direction that is substantially parallel to the longitudinal axis, the first and second operator handles being pressed together such that the first and second operator handles resist further movement toward each other.

20. The pluggable module in accordance with claim 15, wherein each of the first and second operator handles includes respective handle segments that project away from the trailing end and extend substantially parallel to the longitudinal axis, the handle segments being configured to receive the actuating forces for moving the first and second coupling arms.

21. The pluggable module in accordance with claim 15, wherein the first and second coupling arms include grip projections that extend toward the respective sidewalls.

* * * * *